United States Patent [19]

Brockmann et al.

[11] Patent Number: 5,131,929
[45] Date of Patent: Jul. 21, 1992

[54] PRESSURE CONTROL FOR IMPROVED GAS DEHYDRATION IN SYSTEMS WHICH EMPLOY MEMBRANE DRYERS IN INTERMITTENT SERVICE

[75] Inventors: Thomas J. Brockmann, Kirkwood; Arthur W. Rice, O'Fallon, both of Mo.

[73] Assignee: Permea, Inc., St. Louis, Mo.

[21] Appl. No.: 700,815

[22] Filed: May 6, 1991

[51] Int. Cl.$^5$ .............................. B01D 53/22
[52] U.S. Cl. .................................. 55/16; 55/68; 55/158
[58] Field of Search .............. 55/16, 18, 68, 158

[56] References Cited

U.S. PATENT DOCUMENTS

| | | | |
|---|---|---|---|
| 3,442,002 | 5/1969 | Geary, Jr. et al. | 55/158 X |
| 3,735,558 | 5/1973 | Skarstrom et al. | 55/158 X |
| 3,735,559 | 5/1973 | Salemme | 55/158 X |
| 3,930,813 | 1/1976 | Gessner | 55/16 |
| 3,930,814 | 1/1976 | Gessner | 55/16 |
| 3,979,190 | 9/1976 | Hedman | 55/16 X |
| 4,675,030 | 6/1987 | Czarnecki et al. | 55/158 X |
| 4,681,602 | 7/1987 | Glenn et al. | 55/158 X |
| 4,685,940 | 8/1987 | Soffer et al. | 55/16 X |
| 4,783,201 | 11/1988 | Rice et al. | 55/158 X |
| 4,806,132 | 2/1989 | Campbell | 55/158 X |
| 4,857,082 | 8/1989 | DiMartino, Sr. et al. | 55/158 X |
| 4,944,776 | 7/1990 | Keyser et al. | 55/158 X |
| 4,990,168 | 2/1991 | Sauer et al. | 55/158 X |
| 5,030,251 | 7/1991 | Rice et al. | 55/158 X |

FOREIGN PATENT DOCUMENTS

| | | | |
|---|---|---|---|
| 771472 | 11/1967 | Canada | 55/16 |
| 3824400 | 1/1990 | Fed. Rep. of Germany | 55/16 |
| 56-040417 | 4/1981 | Japan | 55/158 |
| 63-209731 | 8/1988 | Japan | 55/16 |
| 63-236517 | 10/1988 | Japan | 55/16 |

Primary Examiner—Robert Spitzer
Attorney, Agent, or Firm—Martha A. Michaels

[57] ABSTRACT

An apparatus and process for dehumidification of a compressed gas using a membrane cartridge dryer wherein substantially dry gas is provided upon process startup without requiring purging of the membrane cartridge. In the apparatus, a back pressure regulator valve controls the release of compressed gas to the dryer and a check valve controls the release of the dry gas from the dryer.

7 Claims, 2 Drawing Sheets

PRESSURE CONTROL FOR IMPROVED GAS DEHYDRATION IN SYSTEMS WHICH EMPLOY MEMBRANE DRYERS IN INTERMITTENT SERVICE

BACKGROUND OF THE INVENTION

This invention relates to an apparatus and a process for dehydrating gases wherein the dehumidifier utilized is comprised of membranes having dehydrating capability. In addition, the invention relates to a process and an apparatus for improving gas dehydration systems which employ membrane dryers placed in intermittent service.

In the use of many gases, removal of water is desired. For instance, removal of humidity from air for a variety of reasons is frequently required. In the manufacture of pharmaceuticals, it is desirable to maintain the pharmaceutical product in a dry atmosphere during packaging as well as providing a dry atmosphere in the package. Other dehumidifying uses of gases include dehumidification of buildings for maintaining comfortable working and living areas during summer months, to providing dry air for communication systems, uses in the textile industry, in certain chemical processes, in the petroleum industry and in many other industrial fields.

Presently there are several methods for removal of water vapor from a gas. One method involves bringing gas into contact with a hygroscopic agent such as silica gel, a molecular sieve, quick lime, calcium chloride, phosphorous pentoxide, lithium chloride, or concentrated sulfuric acid or the like to remove moisture contained in a gas. When utilizing one of the above mentioned hygroscopic agents, it is always necessary to either dispose of or regenerate the used hygroscopic agent. Such disposal or regeneration does not permit continuous operation of the system utilizinq the gas without an alternate back-up for use during regeneration of the hygroscopic agent.

Another method for removal of moisture from a gas involves condensing moisture contained in the gas by compressing and/or cooling the gas to remove the moisture. Although this method permits utilization in a continuous operation, it is disadvantageous as the sole dehumidification method because it requires a large quantity of energy, and dehydration to a level below the freeze point is very difficult and hence costly.

In one of the more recently developed methods, water vapor is removed from a gas by using membranes having selective permeability to water vapor. An example of such a product is the PRISM ® CACTUS ® dryer manufactured by Permea, Inc., St. Louis, Mo. U.S. Pat. No. 4,783,201, Arthur W. Rice et al, hereby incorporated by reference, provides a suitable membrane separator and a method for utilization of membranes to effectively dehumidify a gas.

The above methods discuss systems or methods not suitable for continuous operation and one method suitable for continuous operation. It has been found that certain "continuous" operations are nevertheless interrupted because only intermittent requirements for a continuous dry gas are present.

When using a membrane process for removal of water vapor there are basically two processes; one in which a homogenous membrane is used, and one in which a porous membrane is used. For most membrane systems, a gas portion which also permeates the membrane or an alternate dry gas is utilized to sweep away the permeated water vapor. Generally, the sweep flow is countercurrent to the flow of the gas which is to be dehumidified. As a result, a large concentration gradient of moisture is present along the flow path. However, this use of a countercurrent sweep flow permits continuous high drying capability in a single compact membrane device. (See U.S. Pat. No. 4,783,201, Arthur W. Rice et al)

These membrane devices require a pressure gradient across the membrane. The pressure gradient allows for two methods of transport of a gas across the membrane. For the homogenous membrane, the gas must be adsorbed on one side, diffused through to the opposite side and then desorbed. For the porous membrane, the size of the pores allows flows at different rates for different sized molecules and those having different mean free paths. Some membrane gas separator devices, such as the above mentioned CACTUS ® dryers, operate using both methods simply because a permeable surface is used which also has controlled porosity.

For cyclic pressure systems, such as in air compressor operations where an air compressor starts and stops, the performance of a membrane dehumidifier is subject to certain complexities. When the compressor starts at initial low pressure, very little separation of moisture occurs thereby allowing high humidity product to flow to the dry product outlet port of the membrane device and into downstream piping. This, of course, is disadvantageous to the user of the dry gas system. Furthermore, the feed gas during initial flow at low pressure, carries a larger percentage of water vapor than when the compressor has reached its normal operating pressure and is delivering the gas in compressed form after a large portion of the moisture has been removed as liquid in the compressor aftercooler. As a result, this larger percentage of excess water vapor is forced to condense as the pressure in the membrane device increases rapidly at a substantially constant temperature.

For some membrane dryers, e.g., the above-mentioned CACTUS ® air dryer, the membrane material itself has a reasonably high adsorption capacity for water. Therefore, if action has been taken to purge the membrane with a dry gas source, the excess initial moisture will be adsorbed within the mass of the membrane preventing most of it from reaching the dry outlet port until the system pressure has been reached. Once the system pressure has been reached, the moisture exits the dryer with the permeate gases.

It is an object of this invention to provide an improved process for dehumidification of a compressed gas using a membrane cartridge dryer. The improvement in the process results in the ability to provide substantially dry gas immediately upon process startup while reaching normal operating pressure, without the requirement of purging or sweeping the membrane cartridge during the period of time in which the compressor is turned off.

The advantages provided by the present invention include an improved gas dehumidification process which does not require frequent replacement of any part of the apparatus. The process and apparatus require relatively small amounts of energy and the apparatus is economically fabricated and efficient in operation.

SUMMARY OF THE INVENTION

For cyclic pressure systems, such as in the operation of an air compressor where the compressor starts and stops, the performance of a membrane dehumidifier is subject to certain complexities. When the compressor starts at initial low pressure, very little separation of moisture or humidity occurs, thereby allowing high humidity product gas to flow to the dry product outlet port of the membrane device and, hence, into downstream piping. This of course is disadvantageous to a dry gas process.

The initial flow of gas from a compressor at low pressure, possesses a larger percentage of excess water vapor than does the gas after the compressor has reached its normal operating pressure and is delivering compressed gas. As a result, this larger percentage of excess water vapor is forced to condense as the pressure in the membrane device increases rapidly at a reasonably constant temperature.

For some membrane dryers, e.g., the above-mentioned CACTUS® air dryer, the membrane material itself has a reasonably high adsorption capacity for water. Therefore, if action has been taken to purge the membrane with a dry gas source, the excess initial moisture will be adsorbed within the mass of the membrane preventing much of it from reaching the dry outlet port until the system pressure has been reached.

The present invention provides an apparatus and process suitable for dehydrating gas. The apparatus is comprised of a compressor which compressor has an inlet for receiving the gas to be treated, an outlet to release compressed gas, and an outlet to release any condensed portion of the gas. The compressed gas then flows to a back pressure regulator (BPR) valve which receives the compressed gas and controls the release of the compressed gas to a membrane dehumidifier. The membrane dehumidifier has an inlet to receive the compressed gas from the BPR valve, a product outlet for releasing substantially dry nonpermeate product gas, and a permeate outlet for releasing the permeate gas from the dehumidifier. The permeate gas contains the moisture-laden fraction of the treated gas. The product gas, from the dehumidifier, is received by a check valve to control the release of the nonpermeate product gas to a dry gas system.

The apparatus of the present invention optionally includes a control means, which activates the BPR valve to release compressed gas to the dehumidifier at a predetermined pressure, and to release product gas to a gas system when predetermined conditions are met. The control means may also control the closing of the BPR and check valves when the demand from the dry gas system falls below a predetermined level.

The process of the present invention comprises compressing a moisture-bearing feed gas to a predetermined pressure. After reaching the desired predetermined pressure, the gas is cooled, while the pressure is maintained, to a temperature sufficiently low to allow removal of the condensable moisture in the form of a condensate. The feed gas is released, at a pressure at least equal to the predetermined pressure, to a membrane gas dehumidifier. A major portion of the water vapor from the gas is separated by passing the gas under pressure through a gas dehumidifier, allowing all of the gas to exit the permeate port of the dehumidifier until the nonpermeate substantially dry gas product reaches a predetermined pressure. The dry gas product is then released to a dry gas system for use. This entire process is repeated when the demand for dry gas is interrupted and then resumed. Generally less than 30 seconds is required from the time of the start of the process until the dry gas product is sufficiently dry to meet the system requirements and is thereby released to the dry gas system.

The dehumidifier means is a membrane gas separator and the dry gas systems for which the present invention is particularly suitable are those which require dry gas intermittently. Intermittent demand for dry gas causes the dehydration process to stop and start frequently. Each time the need for dry gas is interrupted, it is necessary to prevent moist gas from accumulating and being retained in the gas separator. If accumulation of moist gas is not prevented, when the process restarts, the separator will discharge moist gas through the product exit port until the pressure in the dehumidifier is sufficient for dry gas to again be produced. Furthermore, it is necessary to prevent passage of start-up product gas from reaching the receiving gas system until the product gas in the dehumidifier meets specifications.

The present invention provides an apparatus and process which permits intermittent operation without backflow purge streams and which provides dry gas substantially immediately upon demand.

DETAILED DESCRIPTION OF THE INVENTION

Figure 1:
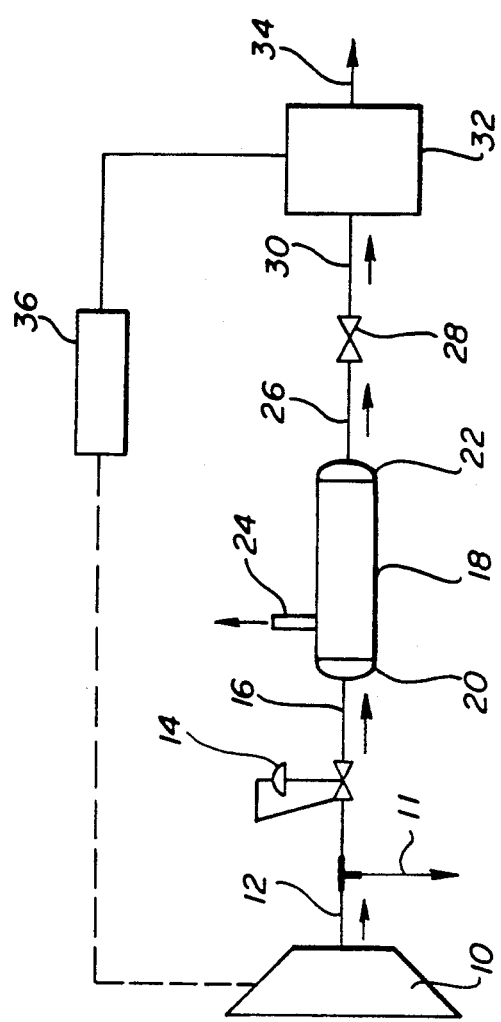
FIG. 1 is a schematic view depicting one embodiment of the apparatus and process of the present invention.

With reference to FIG. 1, a compressor 10 compresses air, or other feed gas, and feeds the compressed gas through a conduit 12 to a back pressure regulator (BPR) valve 14. The conduit 12 provides cooling of the compressed gas to a predetermined level and provides means for discharge of any condensate through a conduit 11. The BPR valve 14 is retained in a closed position until the pressure in the conduit line 12 reaches a predetermined pressure. When that predetermined pressure is reached, the BPR valve 14 releases the compressed gas into the conduit 16 and hence to the dehumidifier 18.

The dehumidifier 18 is a membrane gas separator which has an inlet 20 and a product gas outlet 22. The membrane gas separator 18 separates the pressurized gas stream into a nonpermeate product gas stream and a permeate gas stream. The nonpermeate gas stream exits the gas separator 18 at a product exit 22 and the permeate gas stream exits the separator at an exit port 24. At startup all of the compressed gas is passed through the membrane gas separator 18 and exits the separator at the permeate exit port 24 until the pressure in the dehumidifier 18 reaches a predetermined level. When the dry gas product stream reaches the desired pressure, the gas leaves the separator at exit 22 and proceeds under pressure through a conduit 26 and a valve 28. The valve 28 is in a closed position until the pressure in the gas separator 18 reaches the predetermined pressure. When the gas in the separator 18 reaches that predetermined pressure, dry gas is then available in the separator and the valve 28 opens to permit dry gas product to continue through a conduit 30 to a dry gas system 32.

The dry gas system depicted in FIG. 1 represents a receptacle for dry gas which is stored and then dispensed through an exit 34 to users of the dry gas system. Details of the system are not provided because they are not germane to the present invention. The dry gas system 32 is associated with an operating control 36 which measures the demand for the dry gas product. When there is need for the dry gas product, the operating control 36 starts the air compressor 10 and the system begins operation. It should be noted that the operating control 36 may be an electronic control or a manual control or any other suitable control which is associated with the dry gas system 32.

Figure 2:
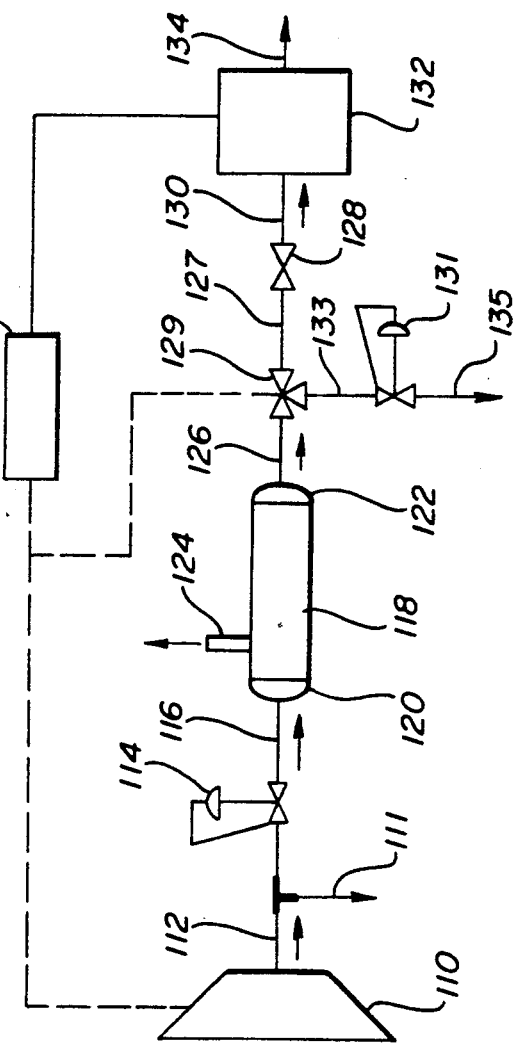
FIG. 2 is a schematic view depicting another embodiment of the apparatus and process of the present invention.

With respect to FIG. 2, most of the components are similar to the components of FIG. 1. The compressor 110 provides compressed air which is conducted through a conduit 112, during which cooling takes place and any condensate is discharged through a conduit 111. The compressed air then proceeds to a BPR valve 114, which, when the pressure at the valve reaches the predetermined setting, opens to permit compressed air to flow through a conduit 116 to a membrane gas separator 118. The compressed air enters the gas separator 118 through an inlet 120 and separates the air into dry product gas which exits at outlet 122 and the permeate non-product gas exits through an exit port 124. When the pressure of the dry product gas reaches a predetermined pressure in a conduit 126, a control valve 129 dispenses the dry product gas either through a conduit 127 or a conduit 133. If the product gas is dispensed through the conduit 127, it is controlled by a valve 128 for further dispensing through a conduit 130 to a dry gas system 132 which dispenses dry gas product through an exit 134. If the control valve 129 is set to route the product gas through the conduit 133, the product gas is controlled by a BPR valve 131 prior to its exit 135 to a second dry gas system or user. The operating control 136 not only operates the air compressor 110 and receives information from the dry gas system 132, but it also operates the control valve 129. The control valve 129 does not dispense the dry gas product to either of the conduits 127 or 133 until a predetermined pressure is reached in the dehumidifier 118.

Figure 3:
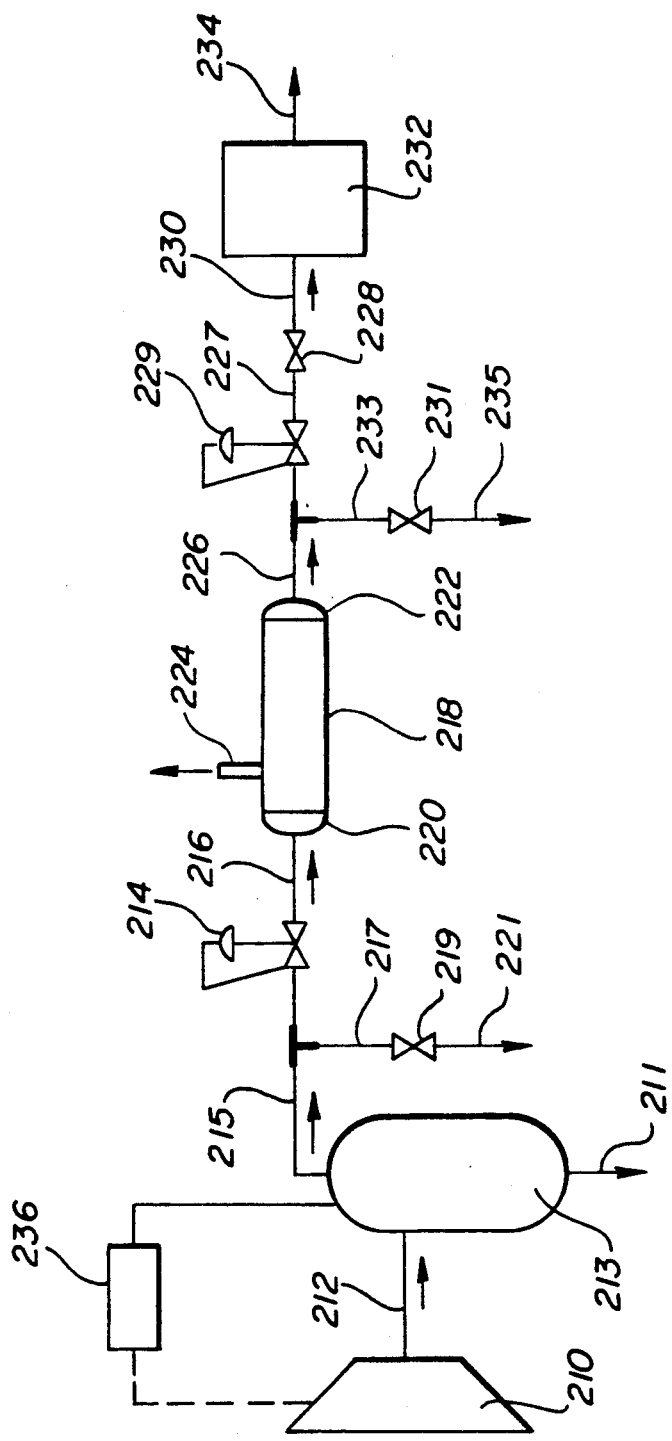
FIG. 3 is a schematic view depicting a still further embodiment of the apparatus and process of the present invention.

With respect to FIG. 3, the numerals are similar to FIGS. 1 and 2 and include a conduit 212, a BPR valve 214, a conduit 216, an inlet 220, an outlet 222, an exit port 224, a valve 228, a conduit 230 and an exit 234 but the difference lies in the earlier part of the system in that this system includes a wet gas storage tank 213 from which a signal is given through a control 236 to the compressor 210. The storage tank 213 has a conduit 211 to permit exit of any condensate from the storage tank 213. This system is designed for situations wherein the dry air requirement from the membrane dryer 218 is for only a portion of the total compressed air capacity or where alternate drying requirements are placed on the system. For example, if the valve 231 is opened and allows the flow of the product gas to go beyond the capacity of the compressor to supply both the dry gas system 232 and the required flow through valve 231, then the BPR valve 229 would close as the pressure declined thereby preventing the possibility of insufficiently dry product gas from entering into the conduit 227. If the wet gas storage tank 213 has a surplus of wet air, which could be used for other needs, the valve 219 can be opened to permit the excess wet gas to escape through conduits 215, 217 and 221. As in FIG. 2, an alternate product gas user is provided for through a conduit 226 and a conduit 233 to a valve 231 which permits product dry gas to be dispensed through a conduit 235.

Quite simply, the use of at least one BPR valve in a process for drying gas, permits regulation of the pressure of a wet gas before the wet gas enters a gas dehumidifier. This allows removal of condensates and prevents uncompressed gas from entering the dehumidifier. In addition to the first back pressure regulator, a check valve or preferably another back pressure regulator is required. At the dry gas product exit from the dehumidifier, a back pressure regulator is present so that gas of insufficient pressure to have been sufficiently dehumidified by a membrane dehumidifier is prevented from exiting the dehumidifier to the dry gas system. Instead, the insufficiently dehumidified gas exits through the permeate exit port until the second pressure regulator permits dry gas to exit the dry gas product port to a dry gas system. Generally, the gas is dried to a moisture content of less than about 0.3% by volume.

The first back pressure valve prevents any wet gas from proceeding into the dehumidifier until a desired pressure level is reached. This first back pressure regulating valve is generally set at a predetermined pressure which is approximately equivalent to 50 to 80% of the nominal operating process pressure. It is desirable for the pressure of the compressed wet gas to reach this predetermined pressure so as to cause a significant amount of the condensable moisture in the wet gas to be removed as condensate at the point of gas compression in the compressor. Once the wet gas has reached the predetermined pressure at the first pressure regulating valve, the valve opens and permits the wet gas to proceed to the dehumidifier which is a membrane gas separating device. This membrane device will commence separation of the wet gas into a wet non-product stream and a dry gas product stream. Until such time as approximately the nominal operating process pressure of the dry gas system is reached, the second control valve placed after the dehumidifier device remains closed, thus the dehumidifier dispenses all product through the non-product exit port. As the gas in the dehumidifier reaches the dry gas system pressure, the gas proceeding to the exit port of the dehumidifier becomes a satisfactory dry gas and the back pressure regulating valve which controls the product gas flow then opens and allows the dry gas to proceed to the dry gas system for use. The dry gas system pressure is at least about 5% higher than the predetermined pressure of the compressed feed gas required to open the second back pressure regulator valve.

Ideally, the overall system will have an operating control which will signal the dehumidifying system when to commence operating the compressor and when to allow the dry product gas to proceed from the dehumidifier to the ultimate user. Many variations of the present invention are possible. For example, if the feed gas is natural gas, the condensate discharged from the pressurized, cooled feed gas, will contain not only moisture but higher hydrocarbon products such as propanes, butanes and other higher hydrocarbons.

The present invention provides a simple and economic means of supplying dry gas to a user who only requires the gas intermittently. Substantially none of the dry product gas is wasted nor is any gas not meeting product specifications allowed to proceed through the system to the user point.

The following example is illustrative of the invention but is not in limitation thereof.

EXAMPLE

Compressed air is delivered to a receiving tank to provide a reservoir of compressed air at a pressure of about 100 psig (689 KPa). The receiving tank acts as a damper on pulsation of the air flow from the compressor so the compressed air supply is provided at a substantially constant pressure. The tank also acts as a storage vessel, a cooler for the compressed air, and a condensation moisture trap in that the moisture condensed during cooling in the tank is easily removed from the tank. The receiving tank has an outlet for removal of condensed moisture which is periodically discharged.

The cooled air from the receiver tank passes through a filter, which preferably is a coalescent filter with a built-in pre-filter. In this manner, oils from the compressor and other particulate matter are removed from the process so as not to foul the membrane dehumidifier.

The filtered air passes through a back pressure regulator valve set in such a way as to allow compressed air to pass to the dehumidifier only when the pressure reaches 50 psig (345 KPa). In the dehumidifier, the air is separated into a dry compressed air product stream and a stream containing a substantial portion of the moisture. Both product streams are exited through the permeate exit port until the pressure within the dehumidifier reaches the selected system pressure, e.g., 80 psig (552 KPa). As this pressure is reached, the second back pressure regulator valve opens.

The dry air product is now available to the user or users. In this example there are two locations which desire the dry air. The first user requires very little or no drying. The second user has a requirement of dry air only. In order to prevent the dehumidifier start-up air to be fed through to the second user erroneously, the system provides a second back pressure regulator in the line following the dehumidifier prior to the second user dry product air supply. The supply to the first user is in the line following the dehumidifier and prior to the second back pressure regulator.

The back pressure regulators (BPR) provide at least three benefits. The BPR situated upstream of the dehumidifier prevents any flow from the receiver tank to the system at start-up until the compressors have compressed enough air to give at least 50 psig (345 KPa) in the receiver tank. The advantages to this pressure buildup include a shorter time for pressure buildup because other portions of the system which might either store or draw pressure are not involved. The pressure build-up allows cooling of the supply air and hence the desired condensation of moisture allowing easy removal of excess moisture. In addition, the presence of the BPR valve ahead of the dehumidifier prevents flow of supply air to the dehumidifier until there is adequate pressure at the dehumidifier inlet to allow the membrane inside the dehumidifier to start its function of separating the gas into a moist stream and a dry product gas stream. If low pressure moist air is allowed to leak or seep to the dehumidifier, that moist air tends to "choke" the membrane dehumidifier.

Generally, there is a moisture alarm placed in the dry product air supply line going to a user. The second BPR valve remains closed until the pressure of the dry gas product meets the requirements of the second user.

At start-up of the process, both BPR valves are closed. The first BPR valve opens when the process pressure is sufficient to supply compressed feed gas to the dehumidifier from the receiving tank. The second BPR valve prevents dry product gas from being supplied to the second user until the dehumidifier reaches sufficient pressure to be purged of moist gas and to be of sufficient pressure to effectively produce dry gas to meet the specifications of the dry gas system of the second user. At this latter point, the second BPR valve opens and the dry product gas is supplied to the second user.

The dry gas system has a moisture alarm and a diverter valve which will divert gas not meeting specifications to another user port or to a bypass port for other storage or use until the moisture alarm indicator shows the dry product gas is again meeting specifications.

A dehumidifier's performance for the average pressure tested of 90 psig (620 KPa), at 100° F. (37.8° C.) inlet dewpoint is as follows:

| DRY AIR FLOW | | DEWPOINT °C. | DEWPOINT °C. |
|---|---|---|---|
| SCFM | (m³/min) | AT 90 PSIG | ATMOSPHERIC |
| 4.8 | (0.129) | 40 | 0 |
| 3.7 | (0.099) | 20 | −20 |
| 3.0 | (0.080) | 0 | −36 |
| 2.5 | (0.067) | −20 | −50 |
| 2.1 | (0.056) | −40 | −62 |

In summary, the second BPR valve and the moisture alarm prevents any flow from going to the second user unless the dewpoint is sufficiently low to clear the alarm. Upon startup, as pressure increases above 50 psig (345 KPa), the dehumidifier begins to function, providing the internal purge required for drying. As the pressure continues to build to 80 psig (552 KPa), there is sufficient time for the drier to commence producing very dry gas. Thus when 80 psig (552 KPa) is reached, and the gas leaves the dehumidifier to flow toward the moisture alarm, the alarm is quickly dried and the alarm clears, typically in less than 30 seconds.

If during times when the first user is drawing product gas, the pressure in the receiver tank falls below 80 psig (552 KPa), flow to a second user will be halted. This permits more dry product air for delivery to the first user and the higher flow is still being kept dry. When the first user interrupts use, and pressure in the receiver has rebuilt to 80 psig (552 KPa), the flow will automatically start to the second user, usually with no alarm condition occurring and thus no loss of product gas to the alarm bypass.

It is claimed:
1. A has dehydration process suitable for being used intermittently comprising:
   (a) compressing a moisture-bearing feed gas to a predetermined pressure;
   (b) cooling the gas while under pressure to a temperature sufficiently low to remove the condensable moisture as condensate;
   (c) releasing the feed gas at a pressure maintained at least equal to the predetermined pressure, to a membrane gas separation means having a permeate outlet and a nonpermeate dry gas product outlet;
   (d) passing the pressurized feed gas through the separation means while allowing all of the gas to exit the permeate outlet until the pressure in the separation means reaches a predetermined pressure;
   (e) releasing the resulting substantially dry gas to a dry gas system; and (f) repeating steps (a) through (e) when the process is interrupted and then resumed.

2. The process of claim 1 wherein the predetermined pressure of the feed gas is at least 50 psig.

3. The process of claim 1 wherein the substantially dry gas has a moisture content less than about 0.3% by volume.

4. The process of claim 1 wherein the predetermined pressure in the gas separation means is at least about 5% higher than the predetermined pressure of the moisture-bearing feed gas.

5. An apparatus suitable for supplying dehydrated gas intermittently comprising:
 (a) a compressor having an inlet to receive a gas to be treated, an outlet to release compressed gas, and an outlet to release any condensed portion of the gas;
 (b) a back pressure regulator valve (BPR) to receive the compressed gas released by the compressor and to release the compressed gas to;
 (c) a membrane dehumidifier having an inlet for receiving compressed gas released by the BPR valve, a product outlet for releasing substantially dry nonpermeate product gas, and a permeate outlet for releasing the permeate gas from the dehumidifier; and
 (d) a second back pressure regulator valve to control the release of the nonpermeate product gas from the dehumidifier to a gas system.

6. The apparatus of claim 5 including a control means to control the opening and closing of the BPR valve and the check valve.

7. The apparatus of claim 5 wherein the second back pressure regulator valve is replaced with a check valve and the gas system provides pressure down stream from the check valve.

* * * * *